Sept. 5, 1950  H. A. WIDMER  2,521,555
FISH BAIT
Filed Nov. 3, 1948
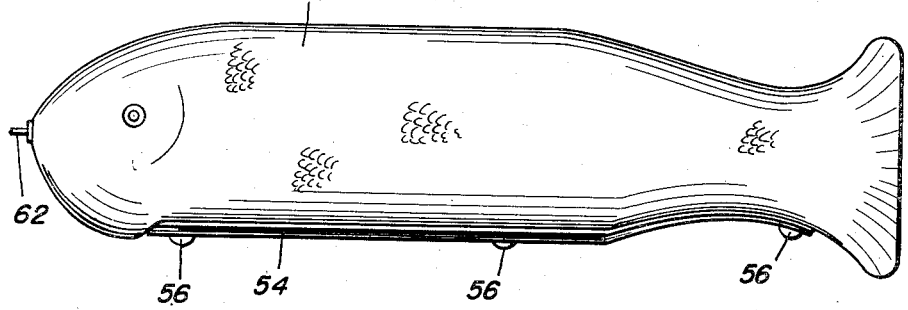
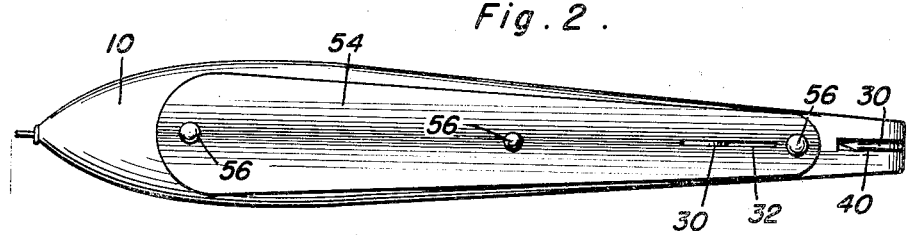
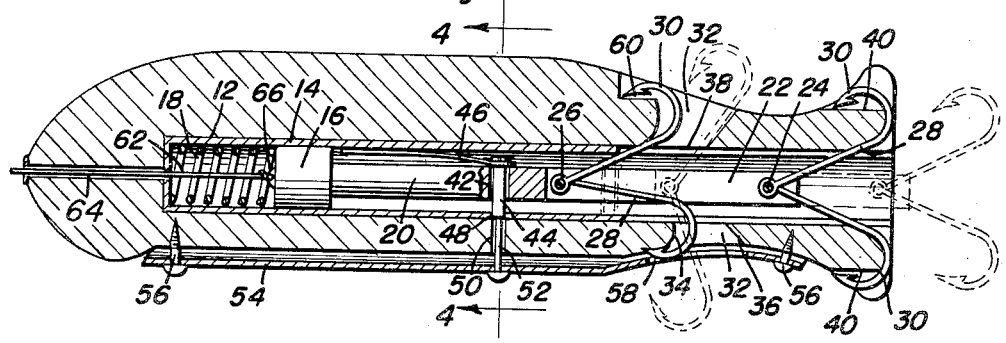
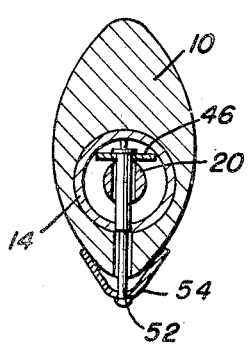
Inventor
Harold A. Widmer
By Clarence A. O'Brien
and Harvey B. Jacobson
Attorneys Patented Sept. 5, 1950

2,521,555

UNITED STATES PATENT OFFICE 2,521,555

FISH BAIT

Harold A. Widmer, Mount Clemens, Mich.

Application November 3, 1948, Serial No. 58,056

6 Claims. (Cl. 43—35)

This invention comprises novel and useful improvements in a fish bait and more specifically pertains to an automatic hook setting device which is particularly free from entanglement by weeds or the like.

The principal object of this invention is to provide an improved fish bait which will offer a minimum of danger of becoming entangled in weeds or the like; and which will automatically set its hooks in the mouth of the fish when the bait is seized by its prey.

An important feature of the invention resides in the provision of a fish lure or plug having an elongated bore opening at the rear end thereof, together with a rod slidable in the bore and which is spring urged to its rearward position therein, which rod is provided with sets of hooks which are selectively advanced into operative position or retracted into inoperative position upon sliding movement of the rod.

A further important feature of the invention resides in the provision of a latch means for holding the rod and the hooks in their inoperative position, which latch means is operated by a trigger means, the latter including an elongated plate pivotally mounted upon the exterior surface of the body and engaging the latch mechanism for operation thereof.

A still further feature of the invention resides in the provision of an automatic hook setting fish bait wherein the body is provided with a plurality of longitudinally extending slots, the hooks being received in the slots, the front and rear walls of the slots constituting cam surfaces for selectively projecting and retracting the hooks upon longitudinal movement of the rod.

These, together with various ancillary features and objects of the invention which will later become apparent as the following description proceeds, are attained by this device, preferred embodiments of which have been illustrated by way of example only in the accompanying drawings, wherein:

Figure 1 is a side elevational view of a first embodiment of the invention;

Figure 2 is a bottom plan view thereof;

Figure 3 is a vertical longitudinal sectional view of the invention as set forth in Figures 1 and 2; and Figure 4 is a vertical transverse sectional detail view taken substantially upon the plane of section line 4—4 of Figure 3.

Referring now more specifically to the accompanying drawings, it will be seen that the invention comprises a body or plug 10 of any suitable material such as wood, plastic or the like, and which is preferably shaped and contoured to resemble a fish bait or lure, this body having an elongated bore 12 therein which opens at its rear end and which if desired may be disposed substantially axially of the body.

This bore is preferably lined with a metallic sleeve 14 of sheet metal or the like, retained in any suitable manner, which sleeve is closed at one end and open at its rear end. Slidably received in the sleeve is a plunger or piston 16 which is urged outwardly of the sleeve as by a compression spring 18, which plunger may be rigidly or otherwise secured to the inward end of a rod 20 which is loosely and slidably disposed in the sleeve, and which is provided with a longitudinal slot 22 at its rear end in which are pivotally received as upon pivot pins 24 and 26, sets of fish hooks 28 having barbs 30 thereon.

As will be apparent from the full and dotted lines showing in Figure 3, these hooks and their barbs may be radially projected and retracted into the slots 22.

Suitable longitudinally extending slots 32 are provided in the body 10 adjacent the rear end thereof, and are provided with round front surfaces 34 and inclined rear surfaces 36 which constitute cam surfaces for engagement with the shanks of the fish hooks for selectively advancing or retracting the same upon longitudinal movement of the rod 20 in the sleeve 14. It will be noted that the sleeve itself is also slotted as at 38 for registry with the slots 32, to permit this positioning and movement of the first or forward set of fish hooks 28. The rear set of fish hooks as will be apparent from Figure 3 is extensible from the rearward end of the body, as indicated in dotted lines and upon inward movement of the rod have their barbed portions receivable in notches or recesses 40 formed in the circumference of the rear end of the body 10.

As above mentioned, the spring 18 urges the rod and consequently the hooks into their outward and operative position, and latch and trigger means are provided for retaining the rod in its cocked position, and for selectively releasing the same as set forth hereinafter.

This latch means includes a transverse bore 42 in the rod 20, in which is loosely received a latch bolt 44 which is yieldingly urged by a spring 46, being secured at one end to the bolt and having its other end engaging the wall of the sleeve, into engagement with a bolt socket 48 extending through the side of the sleeve member 14. A similar bore 50 extends through the body 10 in alignment with the socket 48, and a trigger pin 52 is slidably in the bore 50 and engageable with the end of the bolt 48 for selectively urging the bolt from its socket, against the opposition of spring 46, whereby the compression spring 18 will be effective to project the hooks into their operative position.

The trigger mechanism in addition to the trigger pin 52 comprises an elongated trigger plate 54 which is secured to the outer surface of the body 10 as by fastening screws or the like 56, the plate 54 thus being pivotally or slidably mounted upon the screws so that the same can move towards or from the body and thereby move the trigger pin 52 as above described.

It will be noted that the plate 54 is contoured to snugly fit and conform to the shape of the body 10, and at its rear end is preferably provided with an elongated slot 58 which registers with the slot 32 whereby the first set of hooks 28 may be projected through the registering slots as required by the operation of the device.

It will be noted that in its retracted position, as shown in full lines in Figure 3, the barbs 30 of the forward set of hooks 28, are snugly received against the sides of the body 10, and the lowermost hook is positioned in the space between the plate 54 and the body 10 adjacent the slot 58, whereby the end of the hook is shielded. The uppermost barb 30 of the first set of hooks 28 is in its retracted position received in a shouldered recess 60 in the body portion, whereby as will be seen each of the barbs of the hooks in the retracted position of the device are housed within the confines of the device to prevent accidental entanglement of the barbs upon weeds, vines or the like.

A fishing line may be attached to the device in any desired manner, and may conveniently include an end portion 62 which is receivable in a passage 64 at the front end of the body, and which extends into the sleeve 14 and is attached as at 66 to the front end of the piston 16. By means of this cable, the device may be moved to its cocked or inoperative position by merely pulling upon the cable 62 which draws the piston 16 and the rod 20 inwardly of the sleeve and bore against the opposition of the compression spring 18, until the spring urged bolt 44 drops into the socket 48, with the hooks and barbs being housed in their concealed positions as indicated in full lines in Figure 3. When now the bait is seized in the mouth of a fish, and squeezed thereby, the trigger plate 54 will be moved towards the body, thereby urging the trigger pin 52 against the bolt 44 to release the latter upon its socket 48, whereupon the spring 18 will urge the rod 20 rearwardly, the cam surfaces 36 then projecting the first set of hooks 28 radially outwardly to their dotted line, projected operative position, while the rear hooks will be projected beyond the end of the bore and exposed as also indicated in Figure 3.

It will thus be seen that when the fish strikes or grabs the bait, the trigger will automatically set the hooks, thereby insuring the capture of the fish, and preventing the accidental entanglement of the hooks upon seaweed or other obstructions.

From the foregoing, the construction and operation of the device will be readily understood together with its manifest advantages, and accordingly further explanation is believed to be unnecessary.

However, since numerous modifications and changes will readily occur to those skilled in the art after a consideration of the foregoing specification and accompanying drawings, it is not desired to limit the invention to the exact construction shown and described, but all suitable modifications and equivalents may be resorted to falling within the scope of the appended claims.

Having described the invention, what is claimed as new is:

1. A fishing lure comprising a body having a longitudinal bore open at its rear end, a rod slidable in said bore, said rod having a slot extending longitudinally thereof, said body having recesses through the sides thereof registering with the rod slot, hooks secured in said rod slot and received in said recesses for selective extended position through said recesses outwardly of said body and retracted position in said slot and recesses in said body, operating means for selectively extending and retracting said hooks, a latch means for retaining the hooks in their retracted position, and trigger means for releasing said latch, wherein said latch means comprises a bolt movably mounted on said rod, and a bolt socket in said body for engaging said bolt, said trigger means extending into said bolt socket for engagement with said bolt.

2. A fishing lure comprising a body having a longitudinal bore open at its rear end, a rod slidable in said bore, said rod having a slot extending longitudinally thereof, said body having recesses through the sides thereof registering with the rod slot, hooks secured in said rod slot and received in said recesses for selective extended position through said recesses outwardly of said body and retracted position in said slot and recesses in said body, operating means for selectively extending and retracting said hooks, a latch means for retaining the hooks in their retracted position, and trigger means for releasing said latch, wherein said latch means comprises a bolt movably mounted on said rod, a bolt socket in said body for engaging said bolt, said trigger means extending into said bolt socket for engagement with said bolt, and a leaf spring on said bolt engaging the wall of said bore and urging said bolt towards said bolt socket.

3. A fishing lure comprising a body having a longitudinal bore open at its rear end, a rod slidable in said bore, said rod having a slot extending longitudinally thereof, said body having recesses through the sides thereof registering with the rod slot, hooks secured in said rod slot and received in said recesses for selective extended position through said recesses outwardly of said body and retracted position in said slot and recesses in said body, operating means for selectively extending and retracting said hooks, a latch means for retaining the hooks in their retracted position, and trigger means for releasing said latch, said hooks being pivotally connected to said rod intermediate the ends thereof, said latch means including a bolt movably mounted on said rod, and a bolt socket in said body for engaging said bolt, said trigger means extending into said bolt socket for engagement with said bolt.

4. A fishing lure comprising a body having a longitudinal bore open at its rear end, a rod slidable in said bore, said rod having a slot extending longitudinally thereof, said body having recesses through the sides thereof registering with the rod slot, hooks secured in said rod slot and received in said recesses for selective extended position through said recesses outwardly of said body and retracted position in said slot and recesses in said body, operating means for selectively extending and retracting said hooks, a latch means for retaining the hooks in their retracted position, and trigger means for releasing said latch, said hooks being pivoted to said rod intermediate the ends thereof, and wherein the forward and rear ends of said recesses comprise cam surfaces for effecting pivotal movement of said hooks, said latch means comprising a bolt movably mounted on said rod, and a bolt socket in said body for engaging said bolt, said trigger means extending into said bolt socket for engagement with said bolt.

5. A fishing lure comprising a body having a longitudinal bore open at its rear end, a rod slidable in said bore, said rod having a slot extending longitudinally thereof, said body having recesses through the sides thereof registering with the rod slot, hooks secured in said rod slot and received in said recesses for selective extended position through said recesses outwardly of said body and retracted position in said slot and recesses in said body, operating means for selectively extending and retracting said hooks, a latch means for retaining the hooks in their retracted position, and trigger means for releasing said latch, said hooks being pivoted to said rod intermediate the ends thereof, and wherein said latch means comprises a bolt movably mounted on said rod, a bolt socket in said body for engaging said bolt, said trigger means extending into said bolt socket for engagement with said bolt, and a leaf spring on said bolt engaging the wall of said bore and urging said bolt towards said bolt socket.

6. A fishing lure comprising a body having a longitudinal bore open at its rear end, a rod slidable in said bore, said rod having a slot extending longitudinally thereof, said body having recesses through the sides thereof registering with the rod slot, hooks secured in said rod slot and received in said recesses for selective extended position through said recesses outwardly of said body and retracted position in said slot and recesses in said body, operating means for selectively extending and retracting said hooks, a latch means for retaining the hooks in their retracted position, and trigger means for releasing said latch, said hooks being pivoted to said rod intermediate the ends thereof, and wherein the forward and rear ends of said recesses comprise cam surfaces for effecting pivotal movement of said hooks, and in which said latch means comprises a bolt movably mounted on said rod, a bolt socket in said body for engaging said bolt, said trigger means extending into said bolt socket for engagement with said bolt, and a leaf spring on said bolt engaging the wall of said bore and urging said bolt towards said bolt socket.

HAROLD A. WIDMER.

REFERENCES CITED

The following references are of record in the file of this patent:

UNITED STATES PATENTS

| Number | Name | Date |
|---|---|---|
| 1,009,538 | Lowe | Nov. 21, 1911 |
| 1,318,073 | Gottschalk | Oct. 7, 1919 |
| 1,354,952 | Bullock | Oct. 5, 1920 |
| 1,467,750 | Borg | Sept. 11, 1923 |
| 1,639,766 | Fisher | Aug. 23, 1927 |
| 2,445,461 | St. John | July 20, 1948 |

FOREIGN PATENTS

| Number | Country | Date |
|---|---|---|
| 61,010 | Norway | June 19, 1939 |